United States Patent [19]
Andrews

[11] Patent Number: 5,276,463
[45] Date of Patent: Jan. 4, 1994

[54] RASTER OUTPUT SCANNING ARRANGEMENT FOR A PRINTING MACHINE

[75] Inventor: John R. Andrews, Fairport, N.Y.

[73] Assignee: Xerox Corporation, Stamford, Conn.

[21] Appl. No.: 948,511

[22] Filed: Sep. 22, 1992

[51] Int. Cl.$^5$ .................................................. G03G 15/04
[52] U.S. Cl. .................................. 346/108; 346/157; 359/204
[58] Field of Search ............... 346/108, 157; 359/204, 359/37, 53

[56] References Cited

U.S. PATENT DOCUMENTS

| | | | |
|---|---|---|---|
| 4,474,422 | 10/1984 | Kitamura | 350/6.8 |
| 4,591,903 | 5/1986 | Kawamura et al. | 358/75 |
| 4,847,642 | 7/1989 | Murayama et al. | 346/157 |
| 4,903,067 | 2/1990 | Murayama et al. | 346/160 |
| 4,962,312 | 10/1990 | Mataura et al. | 250/236 |
| 5,068,677 | 11/1991 | Matsuura et al. | 346/108 |

Primary Examiner—Joan H. Pendegrass
Attorney, Agent, or Firm—Gary B. Cohen

[57] ABSTRACT

A laser system having a light source that transmits a first laser beam and a second laser beam along a first optical path and a second optical path, respectively, is provided. The laser system further includes a waveplate disposed adjacent the light source and the waveplate includes a polarization altering segment and a light transmissive segment, the segments being connected to one another. The polarization altering segment is disposed in the first optical path for altering the polarization of the first laser beam as it passes therethrough, and the light transmissive segment is disposed in the second optical path.

31 Claims, 9 Drawing Sheets

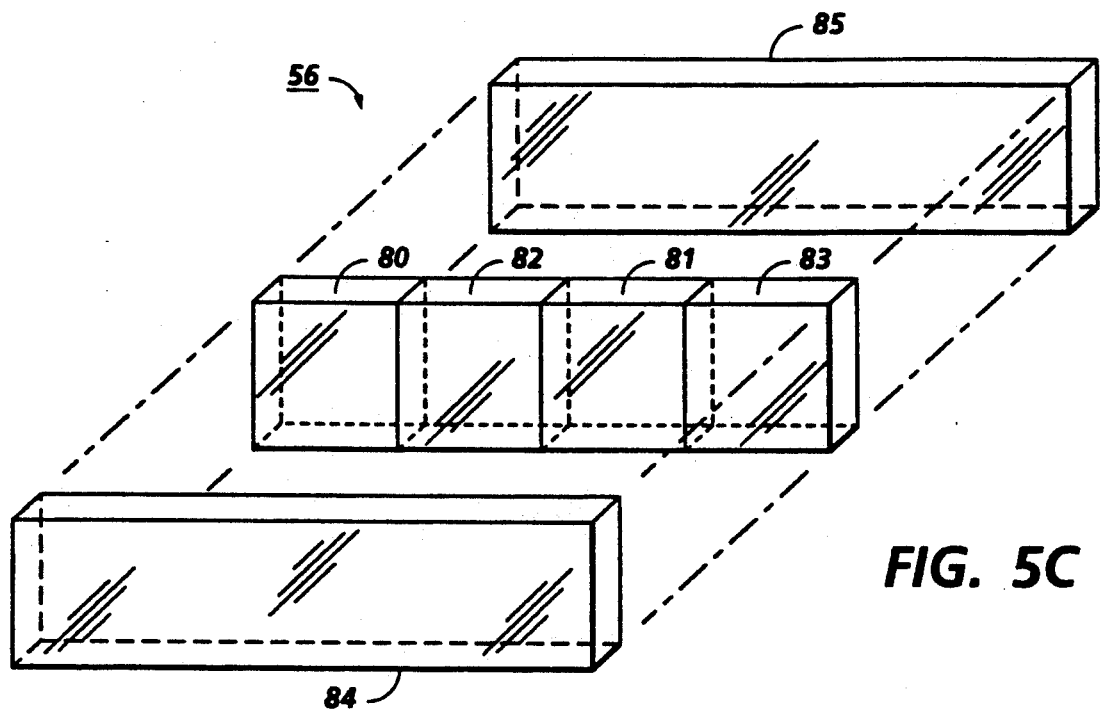
FIG. 5C
FIG. 6
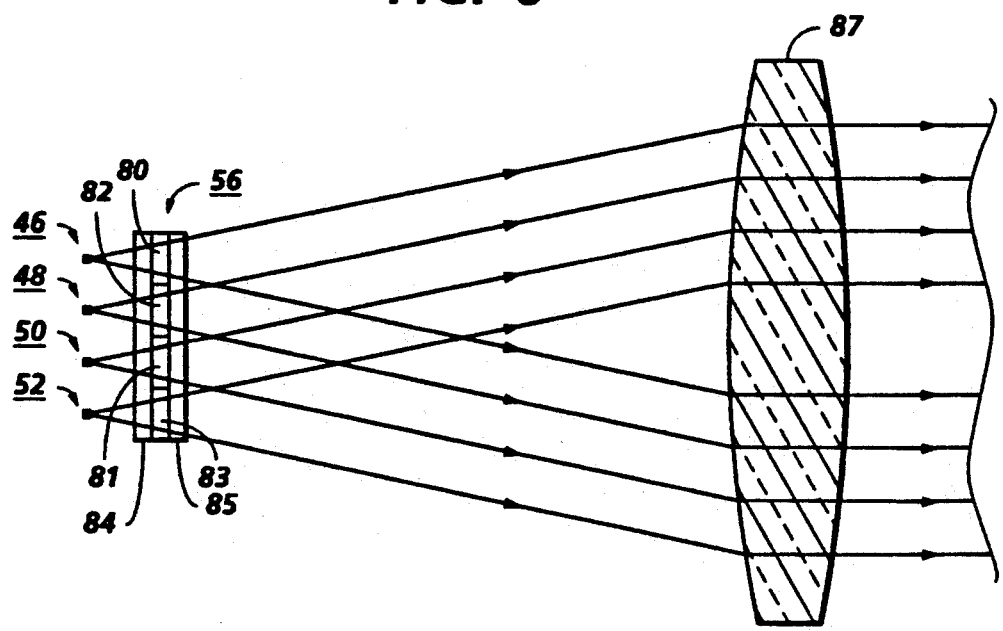

RASTER OUTPUT SCANNING ARRANGEMENT FOR A PRINTING MACHINE

This application is related to U.S. patent application No. 07/812,238 to Tibor Fisli, entitled "A Raster Output Scanner for A Multi-station Xerographic Printing System", U.S. patent application No. 07/948,512 to James Appel et al., entitled "A Raster Output Scanner for a Xerographic Printing System Having Laser Diodes Arranged in a Line Parallel to the Fast Scan Direction", filed concurrently herewith, U.S. patent application No. 07/948,531 to Thomas L. Paoli, entitled "Diode Laser Multiple Output Scanning System", filed concurrently herewith, and U.S. patent application No. 07/948,530 to Appel et al., entitled "A Raster Output Scanner for a Single Pass Printing System which Separates Plural Laser Beams by Wavelength and Polarization", filed concurrently herewith.

The present invention relates generally to a rater output scanning arrangement for a printing machine, and more particularly to a technique for separating and manipulating the polarization of a selected one of a plurality of beams.

Flying spot scanners (often referred to as raster output scanners (ROS)) conventionally have a reflective multifaceted polygon mirror that is rotated about its central axis to repeatedly sweep one or more intensity modulated beams of light across a photosensitive recording medium in a line scanning direction (also known as the fast-scan direction) while the recording medium is being advanced in an orthogonal, or "process", direction (also known as the slow-scan direction) such that the beams scan the recording medium in accordance with a raster scanning pattern. Digital printing is performed by serially intensity modulating each of the beams in accordance with a binary sample stream, whereby the recording medium is exposed to the image represented by the samples as it is being scanned Printers that sweep several beams simultaneously are referred to as multibeam printers.

The following patent relates to both ROS and multibeam printer techniques:
U.S. Pat. No. 4,474,422
Patentee: Kitamura
Issued: Oct. 2, 1984

U.S. Pat. No. 4,474,422 discloses, for example, in FIG. 10B, an arrangement in which multiple lasers are arranged diagonally to sweep multiple beams across a single photoreceptor. The beams are also displaced from each other in the cross-scan direction so that multiple lines can be scanned simultaneously across the photoreceptor. An object of the U.S. Pat. No. 4,474,422 is to reduce variations in pitch by spacing individual lasers within the laser array closely in a compact structure.

High speed process color and multi-highlight color electrophotographic image output terminals require multiple independently addressable raster lines to be printed simultaneously at separate locations. This is called "multi-station printing". One exemplary architecture for a multi-station process color printer uses a plurality of separate ROSs, usually four independent ROSs as illustrated in the following patents:
U.S. Pat. No. 4,847,642
Patentees: Murayama et al.
Issued: Jul. 11, 1989
U.S. Pat. No. 4,903,067
Patentees: Murayama et al.
Issued: Feb. 20, 1990

Problems with the systems of the two patents referenced immediately above include the high cost related to the cost of multiple ROSs, the high cost of producing nearly identical multiple ROSs and the difficulty of registering system colors. Approaches to overcoming problems of multi-station xerographic systems with individual ROSs are disclosed in the following patents:
U.S. Pat. No. 4,591,903
Patentees: Kawamura et al.
Issued: May 27, 1986
U.S. Pat. No. 4,962,312
Patentees: Matuura et al.
Issued: Oct. 9, 1990

U.S. Pat. No. 4,591,903, particularly with regard to FIG. 6, discloses a recording apparatus (printer) having multiple recording stations and multiple lens systems, but only two polygon mirrors and only one drive motor.

U.S. Pat. No. 4,962,312 discloses an arrangement in which a plurality of beams are overlapped using an optical beam combiner. The overlapped beams are deflected using a single polygon mirror, and then separated using an optical filter (and polarizers if more than two beams are used). The separated beams are then directed onto associated photoreceptors.

The following patent applications also relate to multi-station xerographic systems:
U.S. patent application Ser. No. 07/812,238
Filed: Dec. 19, 1991

U.S. patent application Ser. No. 07/948,530 Entitled: "A Raster Output Scanner for a Xerographic Printing System having Laser Diodes Arranged in a Line Parallel to the Fast Scan Direction"
Filed: Oct. 22, 1992

U.S. patent application Ser. No. 07/948,512 Entitled: "A Raster Output Scanner for a Single Pass Printing System which Separates Plural Laser Beams by Wavelength and Polarization"
Filed: Oct. 22, 1992

U.S. patent application No. 07/812,238 discloses a ROS system suitable for deflecting multiple laser beams in a multi-station printer. In U.S. patent application No. 07/812,238, a rotating polygon mirror simultaneously deflects a plurality of clustered, dissimilar wavelength laser beams having their largest divergence angles parallel to one another. Subsequently, the beams are separated by a plurality of optical filters and directed onto respectively associated photoreceptors. Preferably, each optical filter, which can be either wavelength or polarization selective, employs a thin film dielectric beam splitter to achieve beam separation. Similarly dimensioned spots can be obtained on each photoreceptor by establishing similar optical path lengths for each beam. This is facilitated by locating all lasers in one integral unit.

U.S. patent application No. 07/948,512 discloses a ROS architecture in which the laser diodes are positioned along a line that is parallel to the fast scan direction of the ROS (i.e., perpendicular to the rotation axis of the polygon mirror). In this type of architecture, the requirement to have laser diodes closely packed (typically spaced by 10 μm) can be relaxed. This enables multiple laser diodes, at widely separated wavelengths, to be spaced a convenient distance apart thus simplifying their fabrication. For example, diode separation can be relaxed to 333 μm, or 0.33 mm. In such an example, the distance between the first and last diodes in a four laser array (typical for color printing application) is 1 mm.

U.S. patent application Ser. No. 07/948,530 discloses a ROS arrangement including a light source capable of emitting a plurality of laser beams and a polarization control arrangement disposed downstream of the light source. In particular, the light source preferably includes a number of diodes arranged in pairs, with diodes within each pair emitting light at similar wavelenghts, while each pair emits light at a wavelength different from the other pairs. The polarization of the light emitted by one of the lasers within each pair is different from the polarization of the light of the other beam by, for example, 90° so that the two beams can be distinguished, and thus separated from each other. Preferably, the difference in polarization is achieved by providing polarizing plates in the path of at least some of the light beams so that the polarization thereof is rotated by, for example, 90°. The pair of light beams, while having the same wavelength, are differentiated by their different polarizations. The beams can then be separated by post polygon optics in accordance with both wavelength and polarization characteristics of the light beams.

The pertinent portions of the above-cited references are incorporated by reference.

In accordance with the present invention, there is provided a laser input system. The laser input system includes a light source for transmitting a first beam and a second beam through a first path and a second path, respectively. The laser system further includes a waveplate disposed adjacent the transmitting means. The waveplate includes a polarization altering segment, disposed in the first optical path, for altering the polarization of the first laser beam as the first laser beam passes therethrough, and a light transmissive segment, connected to the altering segment and disposed in the second optical path, for transmitting the second laser beam therethrough.

In one disclosed aspect of the present invention, the laser system is adapted for use in a raster output scanning arrangement of a printing machine These and other aspects of the invention will become apparent from the following description, the description being used to illustrate a preferred embodiment of the invention when read in conjunction with the accompanying drawings.

FIG. 5C is a schematic, perspective view of a segmented waveplate fabricated in accordance with yet another embodiment of the present invention;

FIG. 6 is a schematic view of the segmented waveplate positioned adjacent to the light source of the ROS so that each beam passes through the waveplate;

While the present invention is described hereinafter in connection with a multi-station printer having a single raster output scanner (ROS) that simultaneously deflects a plurality of clustered laser beams of dissimilar wavelengths and/or polarizations, and that subsequently separates those beams and applies them to individual photoreceptors where similarly dimensioned and registered spots are produced, the present invention is not intended to be limited to that application. On the contrary, the present invention is intended to cover all alternatives, modifications and equivalents as may be included within the scope of the appended claims.

Figure 1:
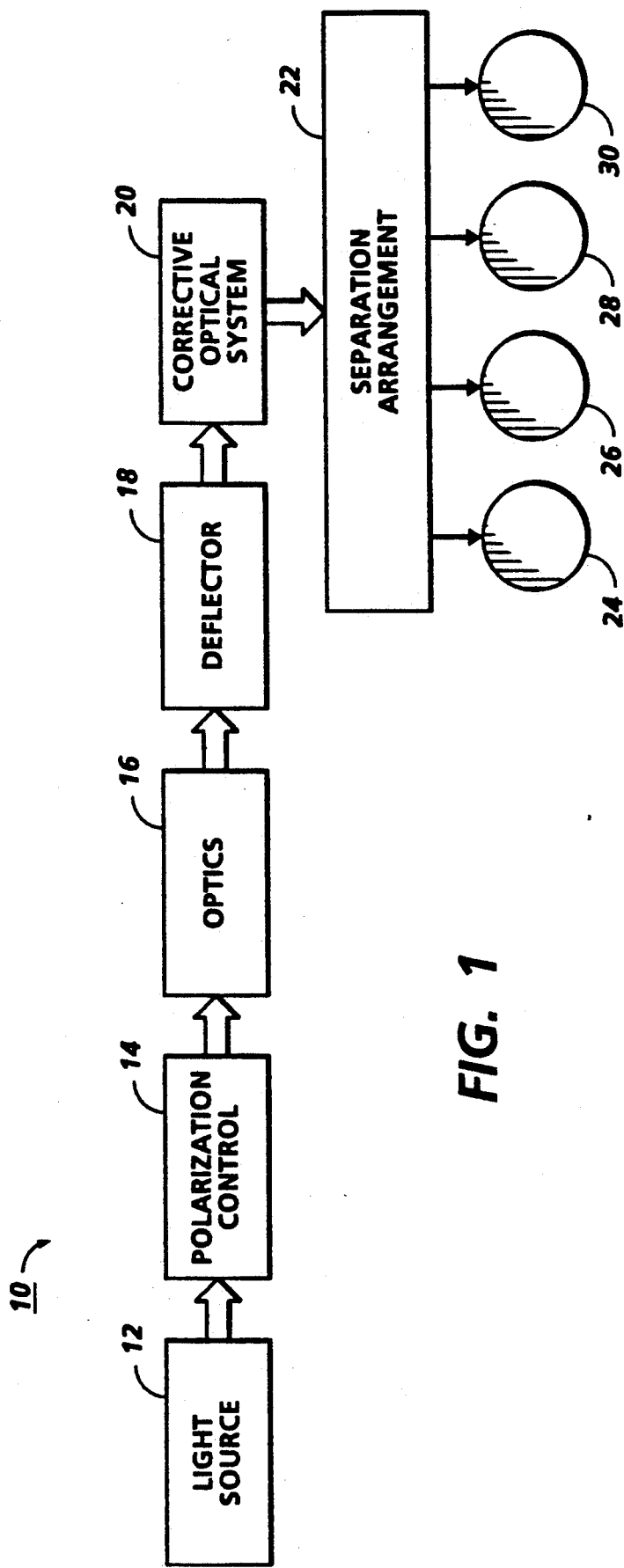
FIG. 1 is a schematic, block diagrametric view of a raster output scanning arrangement for a printing machine.
Figure 13:
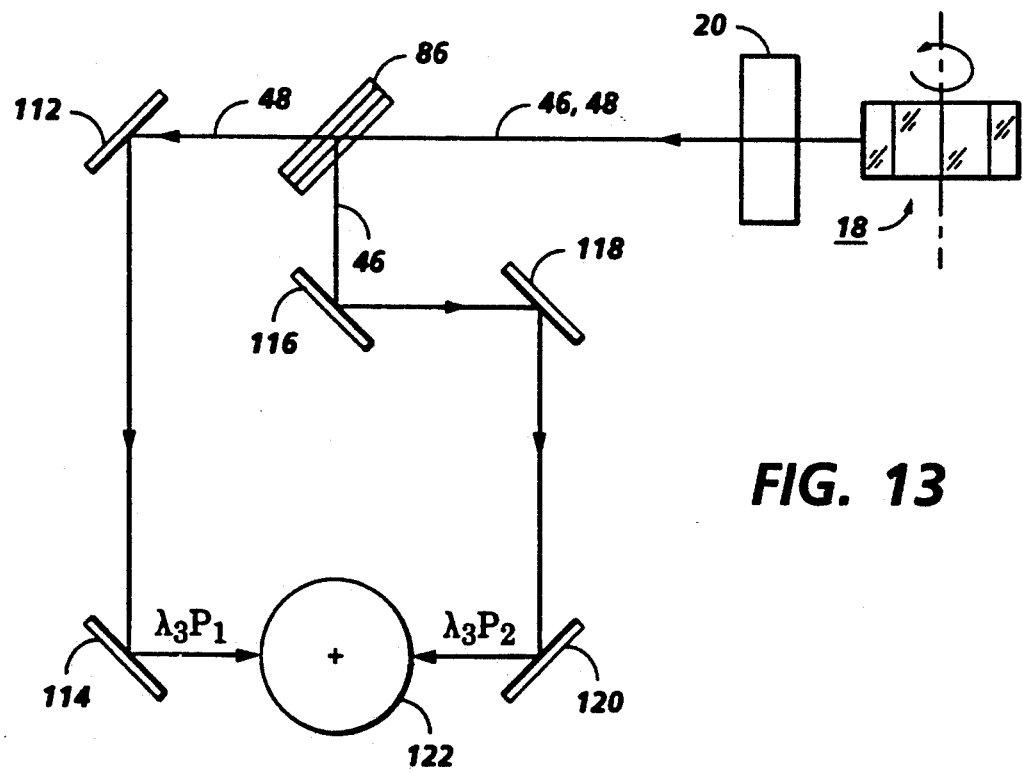
FIG. 13 is a simplified schematic view of a single station/multiple position printer according to an embodiment of the present invention.

Referring to FIG. 1, a ROS arrangement is designated by the numeral 10. The arrangement 10 includes a light or laser source 12 coupled with a beam forming optics system 16 by way of a polarization control section 14. Two or more beams transmitted through the optics system 16 are directed to a separation arrangement 22 by way of a suitable deflector 18 and a correction optical system 20. In turn separated beams are delivered from the separation arrangement 22 to a respective one of rotating photoreceptors 24, 26, 28 and 30 or just one photoreceptor 122 (FIG. 13).

In one preferred embodiment, the ROS arrangement 10 is employed in a multi-station printer in which dissimilar wavelength laser beams are deflected synchronously across the four rotating photoreceptors 24, 26, 28 and 30. As the multi-station printer is preferably for full color reproduction, each laser beam produces a latent image on its associated photoreceptor that corresponds to a system color that will be transferred onto a recording medium (not shown).

In FIG. 1, the deflected laser beams have substantially parallel optical axes and are tightly clustered. One possible technique for obtaining such beams is to overlap beams of different wavelength using dichroic prisms as optical combiners, as discussed in the previously mentioned U.S. Pat. No. 4,962,312. However, to reduce the problems of obtaining equal optical path lengths, to reduce the difficulty of spot registration, and to eliminate beam alignment problems, the ROS arrangement 10 of FIG. 1 generates closely spaced, multiple wavelength laser beams using either a single structure or closely adjacent structures. Such multiple wavelength devices are described by W. T. Tsang in "CW MULTI-WAVELENGTH TRAVERSE-JUNCTION-STRIPE LASERS GROWN BY MOLECULAR BEAM EPITAXY OPERATING PREDOMINANTLY IN SINGLE-LONGITUDINAL MODES," pages 441–443 of Volume 36, Number 6, of *Applied Physics Letter*, Mar. 15, 1980; and by Okuda et al. in "SIMULTANEOUS CW OPERATION OF 5-WAVELENGTH INTEGRATED GaInAsP/InP DFB LASER ARRAY WITH 50 Å LASING WAVELENGTH SEPARATION," pages L904–L906, Volume 23, Number 12 of the *Japanese Journal of Applied Physics*, December 1984.

Figure 2:
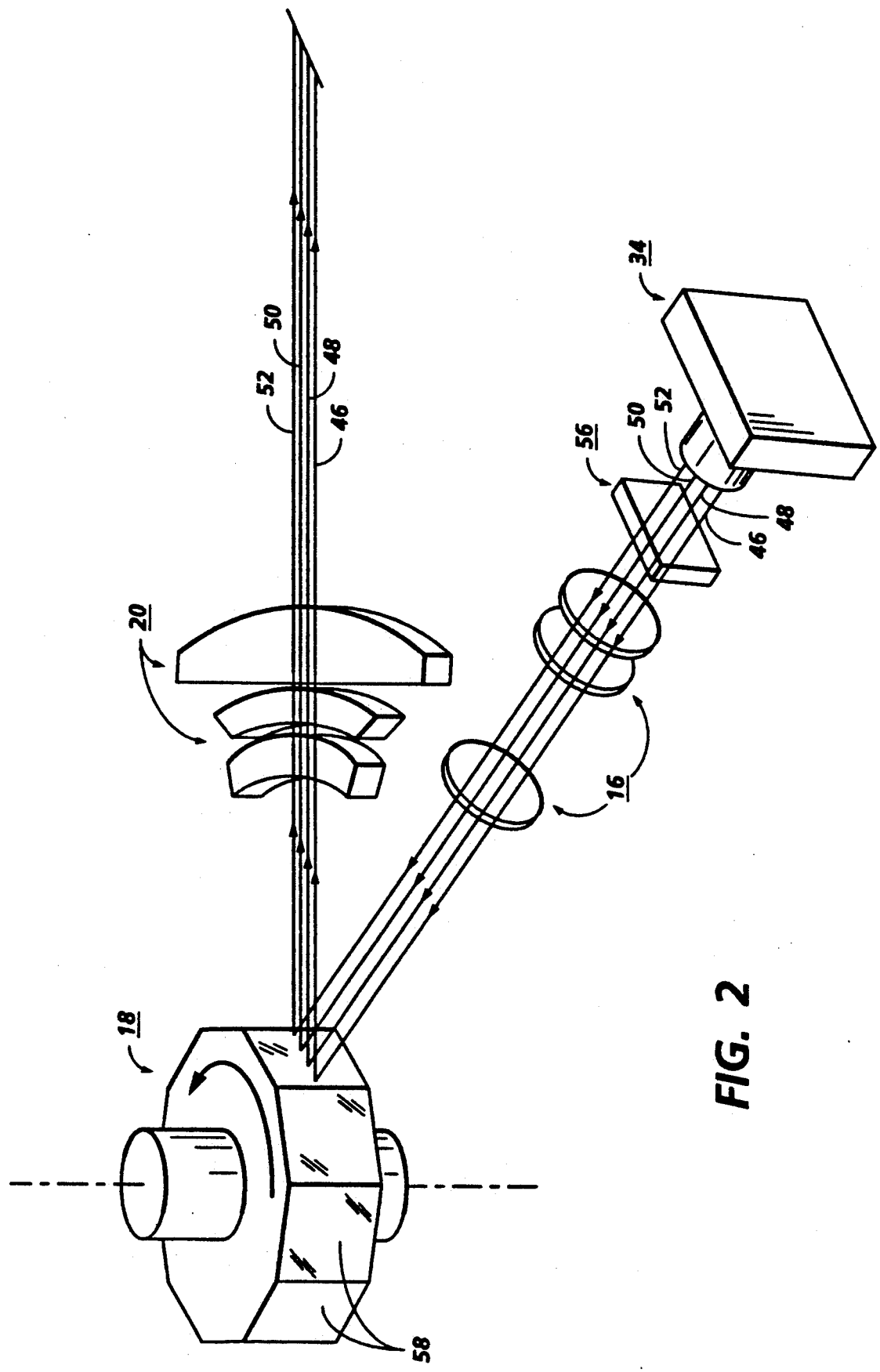
FIG. 2 is a perspective, schematic view illustrating the orientation of certain components of the ROS arrangement of FIG. 1, namely a light source, polarization control system, beam forming optics system, deflector and corrective optical system.
Figure 3:
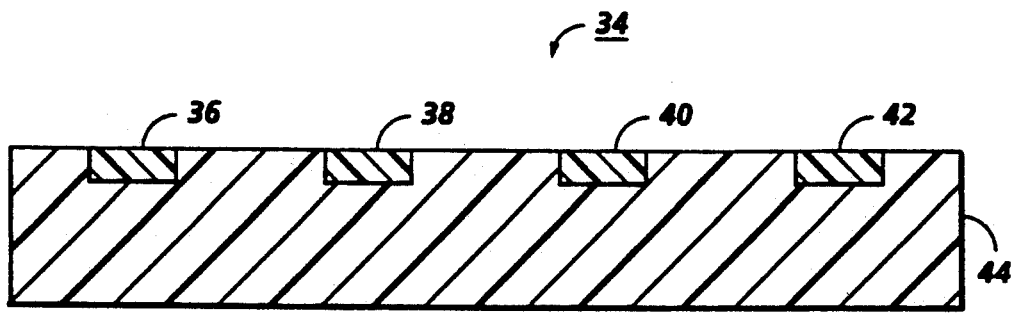
FIG. 3 is a sectional, elevational view of a laser diode array in which four diodes are arranged in a line on one chip.

Referring to FIG. 2, the ROS arrangement 10 is discussed in further detail. The illustrated ROS arrangement 10 of FIG. 2 employs a light generating device 34, which, as shown in FIG. 3, and disclosed in U.S. patent application No. 07/948,530 to Paoli and Appel, can comprise a plurality of relatively closely spaced laser diodes 36, 38, 40 and 42 fabricated monolithically on a single semiconductor chip 44. Typically, the laser diodes are separated from one another by a distance which is greater than or equal to 50 μm. In one example, the light generating device emits four laser beams 46, 48, 50 and 52, two of which beams have a wavelength of 650 nm and two of which beams have a wavelength of 685 nm. As will appear from the discussion below, the ROS arrangement of the present invention can be practiced with more or less than four laser beams, while the respective wavelengths and/or respective polarizations of the employed beams can be altered significantly without affecting the concept upon which the present invention is based. For purposes of clarity, in various drawings of the present application, only the chief rays of the beams 46, 48, 50 and 52 are shown. Light generating device device 34 effectively provides a substantially common spatial origin for each beam. Each beam is independently modulated so that it exposes it associated photoreceptor in accordance with a respective color image.

Still referring to FIG. 2, the four laser beams from device 34 are input to a segmented waveplate 56, the details of which will be described below, and then the optics system 16, preferably including a collimator lens and directing the beams onto an optical path such that they illuminate the deflector 18, which, in one example, comprises a rotating polygon mirror having a plurality of facets 58. As the polygon mirror rotates, the facets cause the reflected beams to deflect repeatedly for input to the correction optical system 20, which focuses the beams and corrects for errors such as polygon angle error and wobble.

Figure 4:
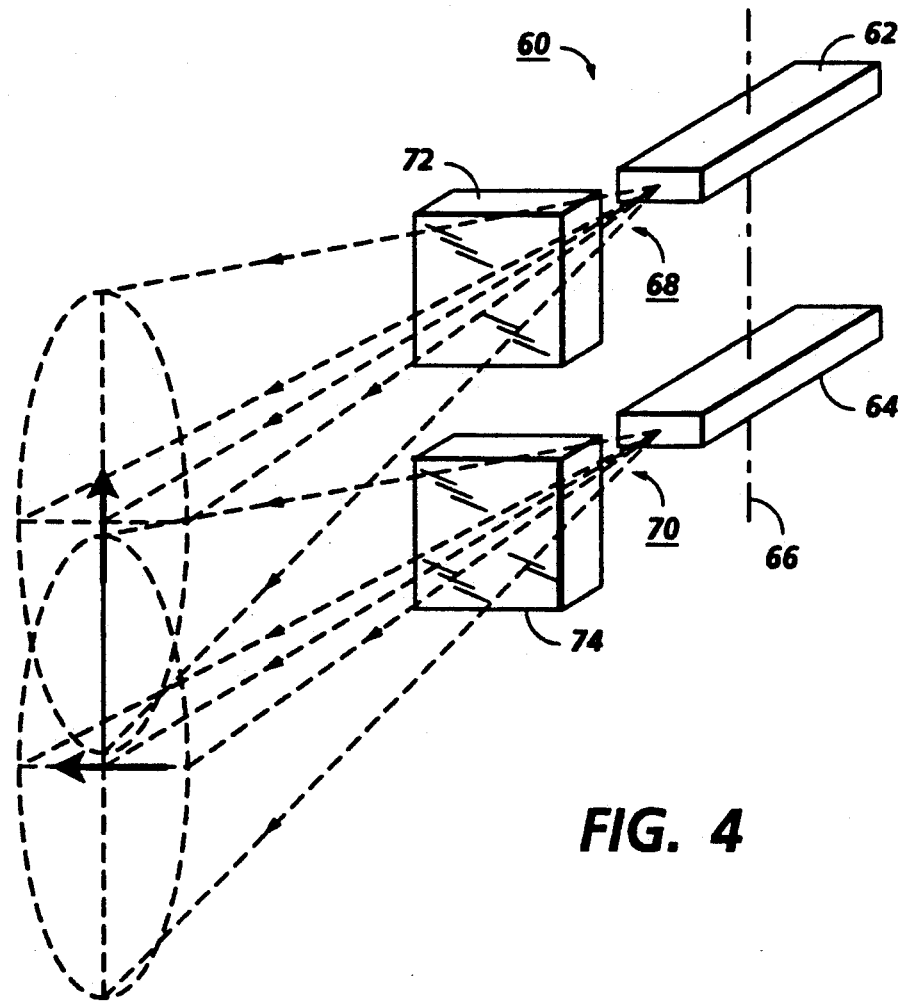
FIG. 4 is a schematic perspective view of an arrangement in which separate waveplates are used to alter the polarization of a selected one of two laser beams.

Referring to FIG. 4, an example of a polarizing arrangement, including two relatively, closely spaced diode lasers, is designated by the numeral 60. While some of the following discussion is directed toward arrangements with just two beams, those of ordinary skill in the art will understand that the concept underlying such discussion can be extended readily to a system with three or more laser beams. In the example of FIG. 4, two semiconductor diode lasers 62, 64 are aligned along a common axis 66, the diode lasers being adapted to emit laser beams 68, 70 of the same polarization. To alter the polarization of the beam 68, a first waveplate 72, such as a small quartz λ/2-plate is positioned in front of the diode laser 68. To maintain the beam 70 in unaberrated, unchanged state, a second waveplate 74, such as a fused silica plate, having similar thickness to the first waveplate 72, is positioned in front of the diode laser 64. While the present example illustrates an approach for changing the orthogonal polarization of a selected beam, the polarization arrangement could be implemented with waveplates that would be capable of providing an approach for changing either the orthogonal linear and/or left-hand or right-hand circular polarization of the selected beam. In accordance with the example, the waveplates 72, 74 could be preassembled as a unitary structure in which the waveplates would be placed side by side. Additionally, in some cases, other elliptical polarizations may prove to be useful.

Implementing the polarizing arrangement 60 as a unitary structure is problematic is several respects. First, the waveplates 72, 74 must be aligned appropriately, and such alignment is necessarily obtained with a high degree of accuracy. Second, in order to position the unitary structure relatively close to the diode lasers and still achieve a reasonably high angle of acceptance between each waveplate and its respective beam, the waveplates are constructed preferably of single order, crystalline waveplates, e.g., single order quartz waveplates. Such waveplates are wavelength sensitive and relatively costly to fabricate.

Figure 5A:
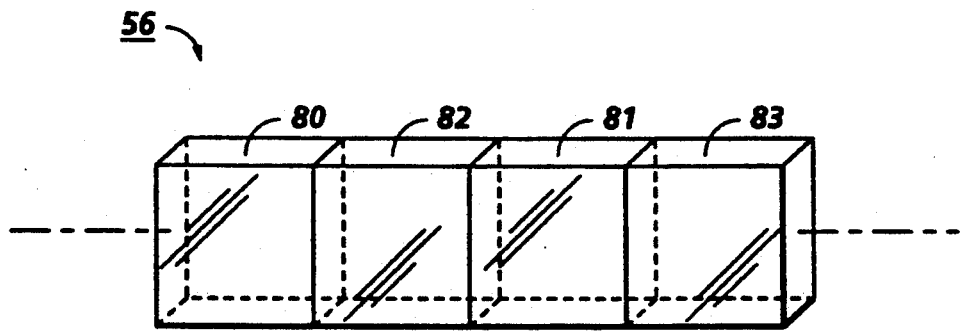
FIG. 5A is a schematic, perspective view of a segmented waveplate fabricated in accordance with one embodiment of the present invention.

Referring to FIG. 5A, one preferred embodiment of the segmented waveplate 56 is shown. The segmented waveplate 56 comprises polarization altering sublayers 80, 81, and nonaltering sublayers 82, 83. For the illustrated segmented waveplate 56 of FIG. 5A, each polarization altering sublayer comprises a λ/2 liquid crystal cell, such as a 90° twisted nematic liquid crystal cell. Other liquid crystal phase types, such as supertwisted nematic, birefringent nematic, smectic, ferroelectric, could be employed for implementing the segmented waveplate 56 without altering the concept underlying the present invention. Indeed, other materials, such as any birefringent material or stretched polymer films could also be used to form each of the polarization altering sublayers 80, 81. The nonaltering sublayers 82, 83 could be formed from, for example, transparent adhesive, which could serve to bind the segmented waveplate 56 together. Alternatively, the unitary waveplate could be constructed by spatially selective domain orientation in magnetooptic or ferroelectric crystals.

Figure 5B:
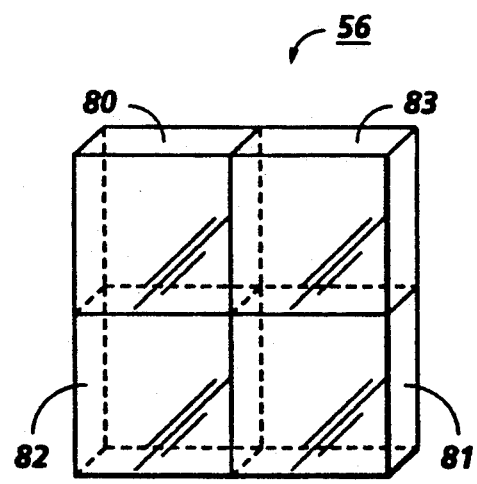
FIG. 5B is a schematic, perspective view of a segmented waveplate fabricated in accordance with another embodiment of the present invention.

While the sublayers 80, 81, 82 and 83 are shown, in FIG. 5A, as being disposed along a common axis, it will be appreciated by those skilled in the art that the sublayers could be disposed along a plurality of axes. That is the sublayers could be configured in a variety of two-dimensional arrangements. For example, referring to FIG. 5B, the unitary, segmented waveplate 56 is shown as a square with four quadrants in which the respective sublayers are disposed. It will be recognized that other arrangements could be employed for the sublayers without affecting the intended purpose of the present invention.

In practice, the connected sublayers 80, 81, 82 and 83 of FIG. 5A can be mounted with a system component, such as a window associated with the light generating device 34. Alternatively, the sublayer can, in another preferred embodiment, be disposed on a support layer, or, as shown in FIG. 5C, disposed between cover layers 84 and 85. Conventional construction techniques can be used to form the layers of FIG. 5C into a single unit.

The polarizing capability of the segmented waveplate 56 can be further enhanced by selectively communicating certain regions of the segmented waveplate, such as the polarization altering sublayers 82, 83, with a signal source. Accordingly, polarization altering characteristics of such regions could be manipulated by applying an electric field thereto. Additionally, polarization altering characteristics of the polarization control section 14 could also be adjusted by employment of a unitary structure including multiple waveplates 56 in series.

Figure 7:
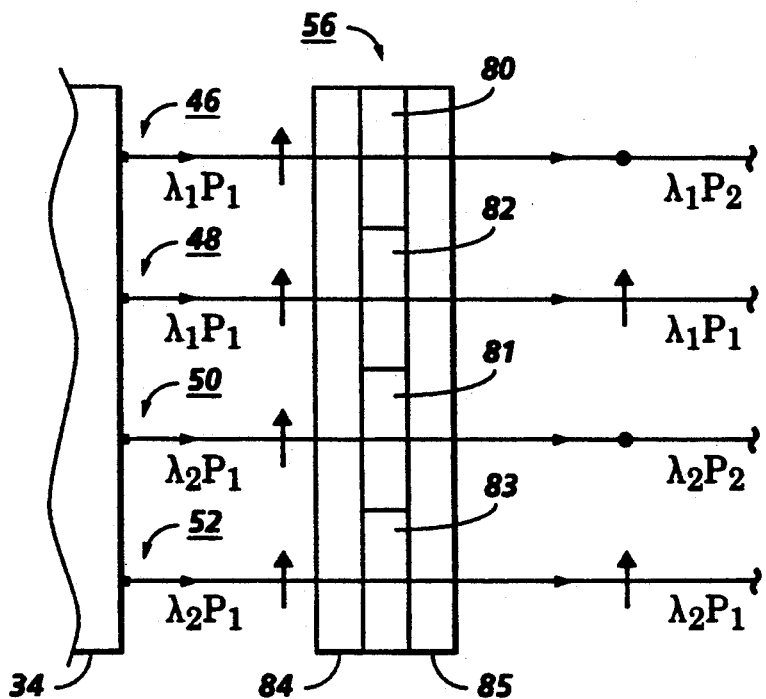
FIG. 7 is a view similar to that of FIG. 6 in which the orthogonal polarization of two beams is shown as being altered by 90°.

Referring to FIGS. 6 and 7, the operation of the segmented waveplate 56 is discussed in further detail. Referring specifically to FIG. 6, preferably, the segmented waveplate 56 is positioned in the paths of the beams 46, 48, 50 and 52 so that each wave passes through a respective one of sublayers 82, 83, 84, 85, and is inputted to a collimating lens 87 of optics system 16. Referring specifically to FIG. 7, the beams have been represented as rays for ease of discussion. As beams 46 and 50 pass through the respective polarization altering sublayers 82, 83, the respective polarizations of the beams are altered orthogonally. On the other hand, upon passing the beams 48 and 52 through the nonaltering sublayers 84, 85, the respective polarizations of beams 48 and 52 remain unchanged.

It has been found that the segmented waveplate 56, when implemented with liquid crystals, has a relatively high angle of acceptance (i.e., at least a range of 0°-20°). Accordingly, the polarization altering layer 78 can be placed relatively close to the light generating device 34, and it is possible to use a single collimating lens in the optics system 16. Moreover, as illustrated in FIG. 6, polarizing operations can be performed upstream of the collimating lens 87. This is advantageous since beams tend to overlap at the collimating lens, making beam-specific polarization transformations difficult in the collimated beams.

Figure 8:
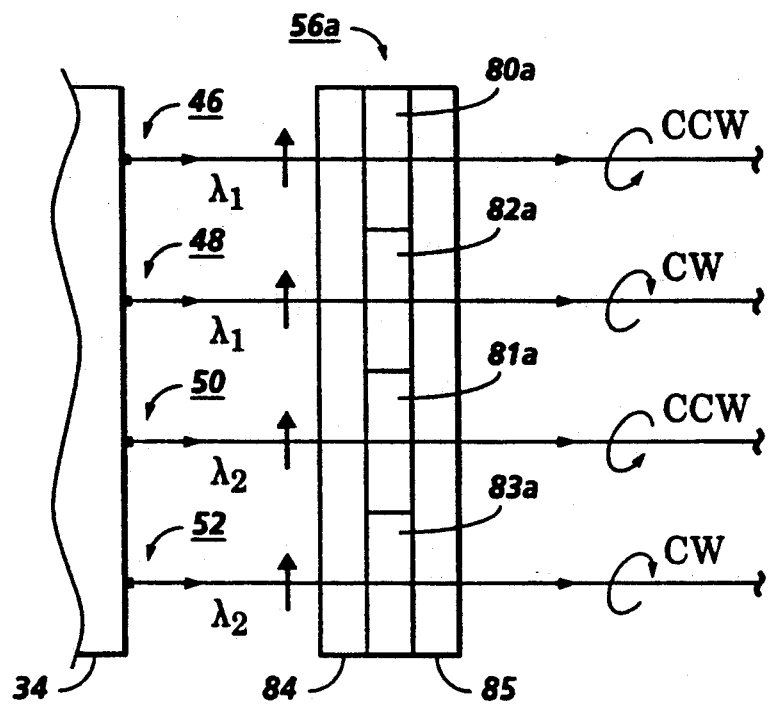
FIG. 8 is a view similar to that of FIG. 6 in which each wave is shown as being altered from an orthogonal polarization to a circular polarization.

It should be appreciated that while FIG. 7 illustrates a situation in which orthogonal polarization is altered, it is also possible, using the concept of segmented waveplate to alter the circular polarization of the beams. For example, referring to FIG. 8, an alternative segmented waveplate, designated with the numeral 56a, with two polarization altering sublayers 82a, 83a and two polarization altering sublayers 84a, 85a, is shown. When the orthogonally polarized beams 46, 48, 50 and 52 of FIG. 8 are passed through respective ones of the polarization altering sublayers 82a, 83a, 84a, 85a their respective polarizations are changed to either right-hand circular or left-hand circular (alternatively, clockwise or counterclockwise). It is further contemplated that the segmented waveplate concept could be employed to alter circularly polarized beams to orthogonally polarized beams.

Figure 9:
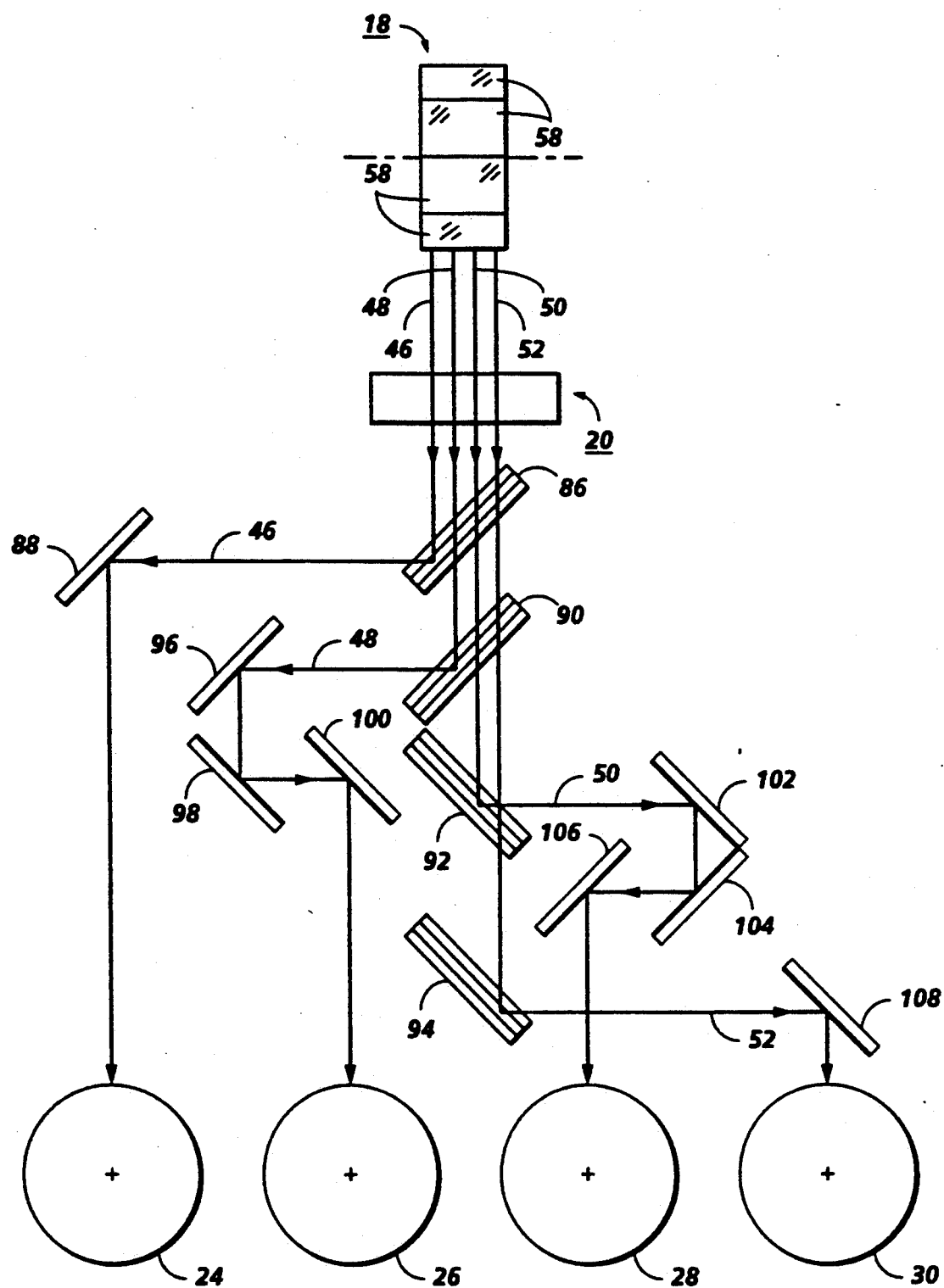
FIG. 9 is a simplified, schematic view of a separation arrangement in FIG. 1.

Referring to FIG. 9, the four laser beams from the image and correction optics 20 are input to a first optical filter 86. In one example of operation, the beams are circularly polarized as shown in FIG. 8. Preferably, the first optical filter 86 is a wavelength and polarization selective mirror comprising a cholesteric liquid crystal cell. The first optical filter 86 is characterized by a value of wavelength and polarization selective reflectivity, which value is chosen so that the beam 46 is reflected by the selective mirror of filter 86 and the beams 48, 50 and 52 are permitted to pass therethrough. Upon being reflected from the mirror of filter 86, the beam 46 is delivered to the photoreceptor 24 by use of a suitable reflective mirror 88.

A general discussion of liquid crystal technology can be found in Jacobs et al., "Liquid Crystal Laser Optics: Design, Fabrication, and performance", J. Opt. Soc. Am., v. 5 at pp1962-1979 (1988), the pertinent portions of which are incorporated herein. More particularly, the liquid crystal cell of filter 86 can possess cholesteric pitch which is defined by reference to a spiral, such as a helix. Preferably, the helix is either right-handed for reflecting left-handed circularly polarized light or left-handed for reflecting right-handed polarized light. Additionally, the center wavelength of the reflectivity can be manipulated by adjusting the cholesteric pitch through choice of chiral dopant and its concentration, and the spectral bandwidth manipulated by choice of the refractive index difference between the long and short axes of the liquid crystal molecule.

Upon passing through the filter 86, each of the beams 48, 50 and 52 is successively reflected by one of optical filters 90, 92 and 94. Each of the filters 90, 92 and 94 are similar in construction to filter 86 except that each of the filters is characterized by a value of wavelength and polarization selective reflectivity, which value is chosen so as to reflect one of the beams 48, 50 and 52 and permit the other beams to pass therethrough. As illustrated in FIG. 9, the beam 48 is reflected by the filter 90 and delivered to the photoreceptor 26 by way of suitable mirrors 96, 98 and 100, the beam 50 is reflected by the filter 92 and delivered to the photoreceptor 28 by way of suitable mirrors 102, 104 and 106, and the beam 52 is reflected by the filter 94 and delivered to the photoreceptor 28 by way of a suitable mirror 108. It should be recognized that the number of optical filters used in the seperation arrangement 22 can be varied in accordance with the desired level of beam contrast. For example, if high contrast for the beam 52 is not required, i.e., if the leakage from the filters 86, 90 and 92 can be communicated to the photoreceptor 30 without significantly degrading printing quality of the ROS arrangement 10, then the filter 94 can be deleted. On the other hand, contrast of the seperation arrangement 22 can be maximized by operatively associating an auxiliary filter with each beam (an accordingly each filter) to minimize filter leakage.

As discussed in patent application Ser. No. 07/948,530 to Appel et al., the problem of maintaining equal optical path lengths for each beam is reduced considerably by maintaining equal optical path lengths for the respective beams throughout a substantial portion of the seperation arrangement. That is, referring to FIG. 9 of the present application, by properly adjusting the optical path lengths after the optical filter 86, the optical path lengths are set the same. This adjustment can be achieved by appropriate positioning of the mirrors 88, 96, 98, 100, 102, 104, 106 and 108. Proper adjustment of optical paths in the separation arrangement 22 results in similarly dimensioned spots at each of the photoreceptors 24, 26, 28 and 30, and reduces problems in registration.

To demonstrate the feasibility of employing liquid crystal cells in a beam separation arrangement, a simplified model, with two beams of different wavelengths yet similar circular polarization handedness, and two cholesteric reflectors each having a reflection maximum near the wavelength of each of the beams, was implemented. Ideally, additional, oppositely polarized beams, with different wavelengths would not be reflected to any significant degree and therefore would not contribute to crosstalk.

In implementing the model, the following issues, among others, were considered:

ISSUE 1

The first design issue is that if the peak reflection maximum and laser wavelength are exactly matched, the reflectivity will begin to fall off immediately as the angle of incidence on the filter (i.e. cell) is increased. However, if the laser wavelength is shorter than the peak reflectance at normal incidence, then the angular scan range still having a high reflectance is increased.

ISSUE 2

The wider the spectral bandpass, the wider the scan angle with high reflectance but the further apart the wavelengths must be to achieve low crosstalk. For a given required scan angle, the angular reflection variation and the laser wavelength separation must be traded off to achieve an acceptable crosstalk level.

The following constraints were employed for the implementation:

| TRIAL DESIGN | |
|---|---|
| Laser Wavelengths | $\lambda_1 = 650$ nm |
| | $\lambda_2 = 685$ nm |
| Cholesteric peak wavelengths | $R1 = 658$ nm |
| | $R2 = 693$ nm |
| Spectral bandwidth (FWHM) (assume Gaussian reflectance) | $\lambda_{FWHM} = 16.65$ nm |

Comments:
Each beam is right circularly polarized; and for FIG. 10, the scan angle is out of the plane of the paper.

Figure 10:
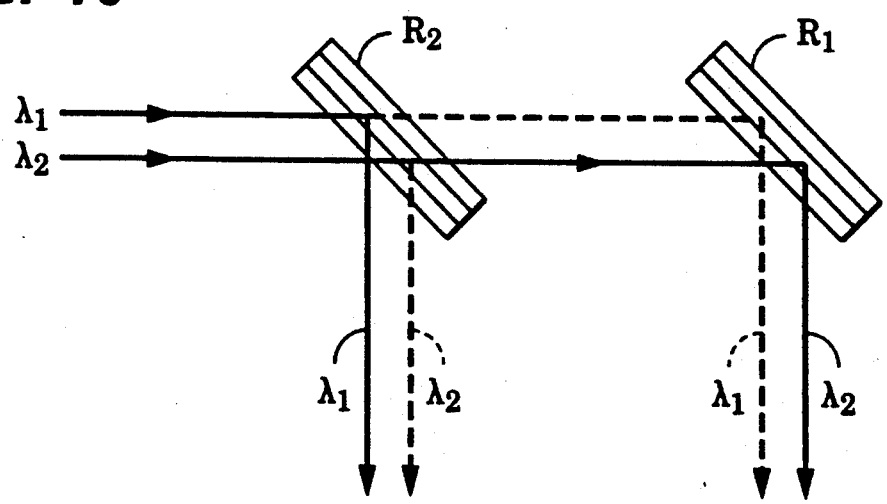
FIG. 10 is a schematic representation of a model system in which two beams are transmitted through optical filters, the filters being fabricated in accordance with the disclosure of the present invention.

Referring to FIG. 10, a schematic representation of the model, demonstrating the relationship of the beams to the liquid crystal cells/mirrors, is shown. As shown in FIG. 10, there is some leakage at each of the optical filters. That is, in reality, neither of the filters is completely selective.

Figure 11:
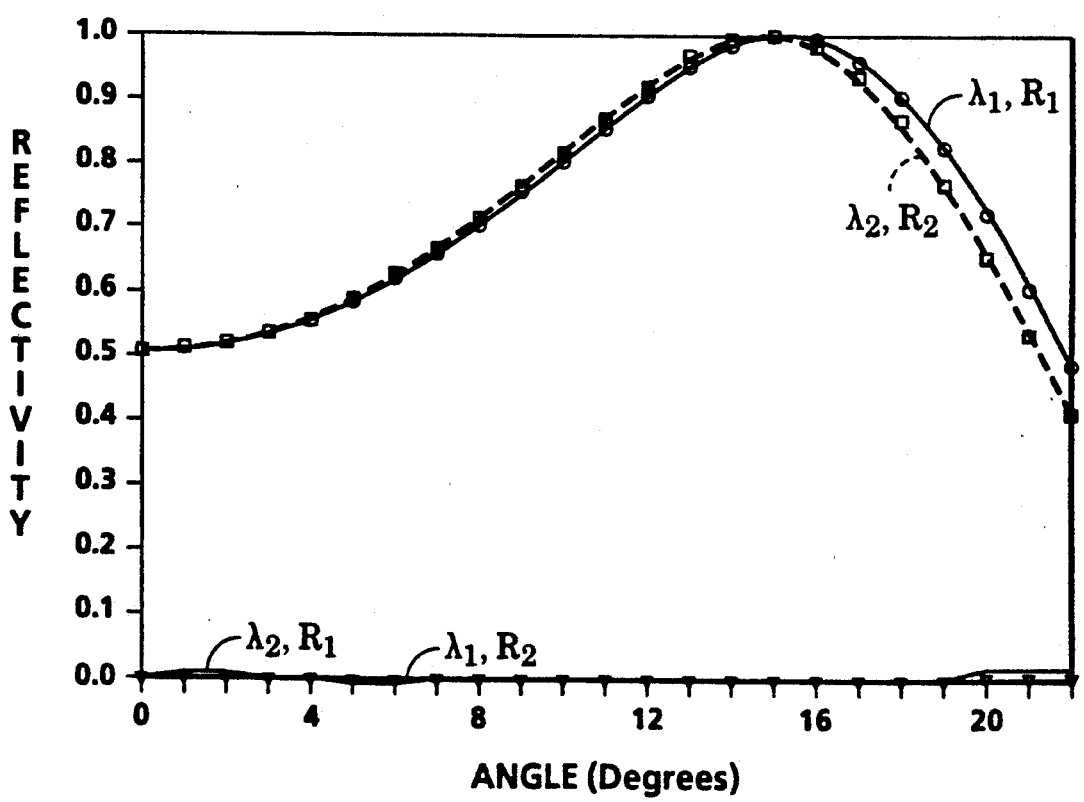
FIGS. 11 and 12 are graphs illustrating selected results obtained during the operation of the model system.
Figure 12:
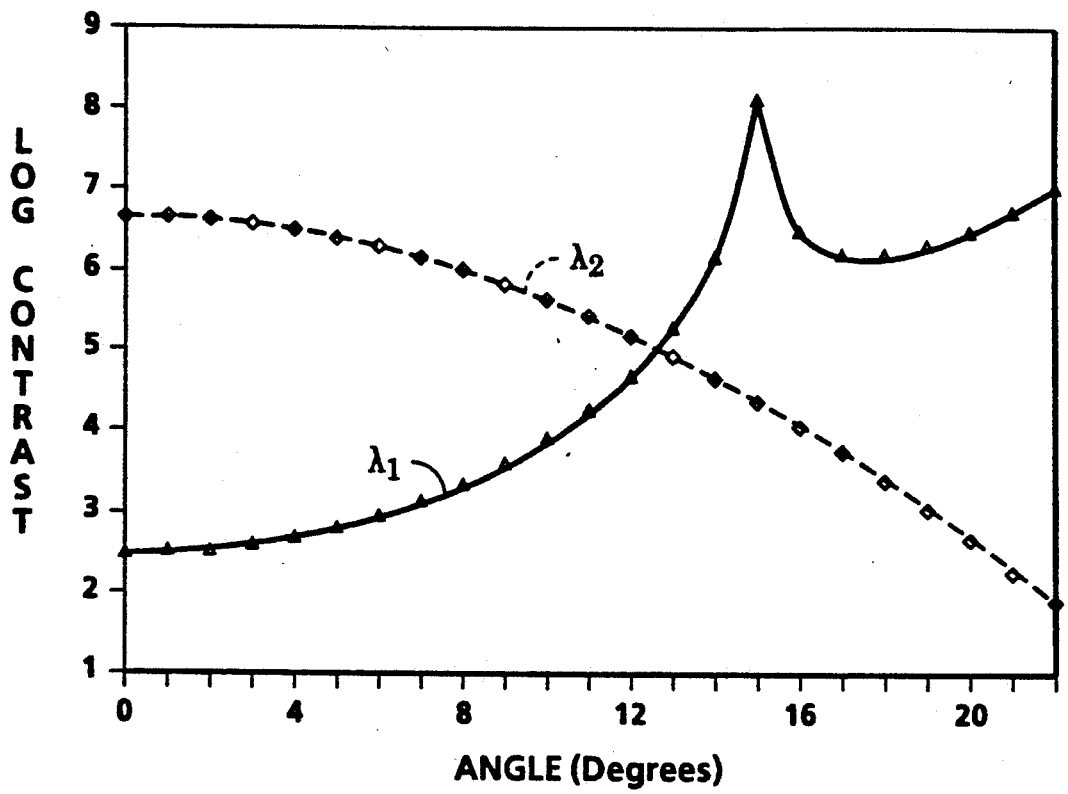

Referring to FIGS. 11 and 12, results for a simulation of the model implementation operated under the constraints of the trial design, is shown. FIG. 11 shows the reflectivity of the cholesteric mirrors for both beams, while FIG. 12 shows the contrast of the cholesteric mirrors for both beams. For half-scan angles <22°, the reflectivity is >50% and peaking of the reflectivity away from the normal occurs because the laser wavelength and the cholesteric mirror are offset to enable the larger scan angle. Simultaneously, when the contrast for half-scan angles <22°, the contrast in the image plane is >100 for both beams.

It will be appreciated by those skilled in the art that an extension of the model would involve copropagating two additional beams at 650 nm and 685 nm, each of the copropagated beams having left-hand circular polarization, and appropriately applying another set of filters at 658 nm and 693 nm with the additional beams.

It will further be appreciated by those skilled in the art that the ROS concept of the present invention is not limited in use to a multi-station printer. In another embodiment, illustrated by FIG. 13, a single station/multiple position photoreceptor 122, for example, a belt or drum, architecture can be used. In this embodiment multiple beams 46, 48 of differing polarizations but similar wavelengths, for example, are deflected off a facet 58 of the polygon mirror for deflector 18 as the polygon mirror is rotated about its central axis. Once deflected, the beams 46, 48 pass through the corrective optical system 20, which system 20 corrects the beams 46, 48 for any beam characteristic variations caused by the polygon. After passing through the corrective optical system 20, the beams are separated based on their polarizations by the first optical filter 86. The beam 46 is reflected while the beam 48 is passed. These beams 46, 48 are then directed to the proper exposure position on the multiple position photoreceptor 122 by mirrors 112, 114, 116, 118 and 120.

Numerous features of the present invention will be appreciated by those skilled in the art.

One feature of the present invention is that several advantageous results ensue from the use of liquid crystal technology to construct the segmented waveplate. First, in view of the small size of liquid crystals, the segmented waveplate can accommodate readily arrays of closely spaced laser emitting elements, such as an array of laser diodes. Moreover, in view of the compactness of liquid crystals, the segmented waveplate can be constructed as a single piece with great ease. Second, due to the relatively low cost of liquid crystals, manufacturing costs of the segmented waveplate are kept at a relatively low level. Third, the wavelength sensitivity of the phase retardation of liquid crystal cells is quite low so that certain liquid crystal cells, such as a twisted nematic liquid crystal cell, can be employed over a wavelength range of 630 nm to 780 nm with only relatively modest degradation in contrast. Finally, it has been found that a segmented waveplate constructed with liquid crystals possesses larger acceptance angles than a segmented waveplate constructed with crystal-line or stretched polymer film. Accordingly, the segmented waveplate constructed with liquid crystal is capable of providing a relatively purer polarization state for each beam transmitted therethrough. Moreover, the segmented waveplate can be placed relatively close to the source of the laser beams, and a single lens can be used to collimate the beams.

Another feature of the present invention is that several advantageous results ensue from the use of liquid crystal technology to construct optical filters. First, an optical filter constructed with liquid crystal is highly selective in terms of both wavelength and polarization. Accordingly, such optical filter is more flexible in application than a filter which is simply either wavelength selective or polarization selective. Second, both wavelength selectivity and/or polarization selectivity of the optical filter can be manipulated readily by adjusting the pitch of the liquid crystal, refractive properties of the liquid crystal and/or handedness or direction of the liquid crystal. Finally, separation is facilitated by the use of liquid crystals which tend to afford a relatively large angle of acceptance.

While the present invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as defined in the following claims.

What is claimed is:

1. A laser system, comprising:
   means for transmitting a first laser beam and a second laser beam along a first optical path and a second optical path, respectively; and
   a waveplate, disposed adjacent said transmitting means, including:

a polarization altering segment, disposed in the first optical path, for altering the polarization of the first laser beam as the first laser beam passes therethrough, and a light transmissive segment, connected to said altering segment and disposed in the second optical path, for transmitting the second laser beam therethrough.

2. The laser system of claim 1, wherein said transmitting means comprises a light source adapted for emitting a plurality of laser beams.

3. The laser system of claim 2, wherein said light source includes a first laser diode and a second laser diode for emitting the first and second laser beams, respectively.

4. The laser system of claim 1, wherein said waveplate further comprises a support layer upon which said segments are mounted.

5. The laser system of claim 1, wherein said polarization altering segment comprises a liquid crystal.

6. The laser system of claim 5, wherein said liquid crystal comprises a nematic phase type liquid crystal.

7. The laser system of claim 1, wherein said waveplate comprises a stretched polymer film.

8. The laser system of claim 1, in which the first and second laser beams comprise first and second wavelengths, respectively, with the respective magnitudes of the first and second wavelengths being substantially equal.

9. The laser system of claim 1, wherein said light transmissive segment alters the polarization of the second laser beam.

10. The laser system of claim 1, wherein the first laser beam is linearly, orthogonally polarized, prior to being transmitted through said waveplate, and is circularly polarized upon being transmitted through said waveplate.

11. The laser system of claim 1, further comprising a collimating lens, positioned adjacent said waveplate, for collimating the first and second laser beams.

12. The laser system of claim 11, wherein said waveplate is disposed intermediate of said light source and said collimating lens.

13. The laser system of claim 1, in which an angle of acceptance is defined by the first laser beam and a surface of said waveplate, with the angle of accetance having a range of at least 0°-20°.

14. The laser system of claim 1, in which said transmitting means emitts a third laser beam along a third optical path of transmission and said waveplate further comprises a third segment disposed in the third optical path, wherein said third segment alters the polarization of the third laser beam as the third laser beam passes therethrough.

15. A raster output scanning arrangement for a printing machine of the type having a photoreceptor, comprising:

means for transmitting a first beam and second beam along a first optical path and second optical path, respectively;

a waveplate disposed adjacent said transmitting means, including a polarization altering segment, disposed in the first optical path, for altering the polarization of the first laser beam as the first laser beam passes therethrough, and a light transmissive segment, connected to said altering segment and disposed in the second optical path, for transmitting the second laser beam therethrough, wherein the the photoreceptor is positioned for receiving the first beam.

16. The raster output scanning arrangement of claim 15, wherein said altering segment comprises a liquid crystal.

17. The raster output scanning arrangement of claim 15, further comprising an optical filter, said optical filter being interposed between said waveplate and the photoreceptor for receiving the first and second beams, said optical filter being selective with respect to both wavelength and polarization, said optical filter reflecting the first beam and passing the second beam therethrough.

18. The raster output scanning arrangement of claim 17, wherein said optical filter comprises a liquid crystal cell.

19. The raster output scanning arrangement of claim 17, in which the printing machine includes a second photoreceptor and a set of reflective mirrors, wherein said optical filter interacts cooperatively with said set of mirrors for directing the first and second beams to the first photoreceptor and the second photoreceptor, respectively.

20. The raster output scanning arrangement of claim 15, wherein said light transmissive segment alters the polarization of the second beam.

21. The raster output scanning arrangement of claim 15, further comprising a collimating lens, positioned adjacent said waveplate, for collimating the first and second beams.

22. The raster output scanning arrangement of claim 21, wherein said waveplate is disposed intermediate of said light source and said collimating lens.

23. The raster output scanning arrangement of claim 17, further comprising a polygon mirror mounted for rotation about a central axis for simultaneously deflecting the first and second beams to said optical filter.

24. A raster output scanning arrangement for a printing machine of the type having a photoreceptor, comprising:

means for transmitting a first beam and a second beam along a first optical path and a second optical path, respectively;

means for altering the polarization of the first beam;

means for deflecting the first and second beams into a third optical path; and a single optical filter disposed in the third optical path, said single optical filter being selective with respect to both wavelength and polarization and being configured in a manner that permits the first beam to be reflected and the second beam to be passed through said single optical filter.

25. The raster output scanning arrangement of claim 24, wherein each of the first and second beams is orthogonally polarized.

26. The raster output scanning arrangement of claim 24, wherein said single optical filter comprises a liquid crystal cell.

27. The raster output scanning arrangement of claim 26, wherein said liquid crystal cell is characterized by an adjustable pitch with the wavelength selectivity being manipulated by adjusting the pitch of said liquid crystal cell.

28. The raster output scanning arrangement of claim 26, wherein said liquid crystal is characterized by a cholesteric liquid crystal structure having a selected direction with the polarization of the first beam being manipulated by selecting the direction of said cholesteric liquid crystal structure.

29. The raster output scanning arrangement of claim 24, in which the printing machine includes a second photoreceptor and a set of reflective mirrors, wherein said single optical filter interacts cooperatively with said set of mirrors for directing the first and second beams to the first photoreceptor and the second photoreceptor, respectively.

30. The raster output scanning arrangement of claim 24, in which said light source is adapted to emit a third beam, said deflecting means deflects the third beam into the third optical path, said separating means separates the third beam from the first and second beams, and the third beam passes through said optical filter, further comprising:

a second optical filter spaced from said first optical filter, said second optical filter being adapted to receive the second and third beams, said second optical filter being selective with respect to both wavelength and polarization and being adapted to reflect the second beam and transmit the third beam therethrough.

31. The raster output scanning arrangement of claim 30, wherein said second optical filter comprises a liquid crystal cell.

* * * * *